Aug. 19, 1930.   T. H. SYMINGTON   1,773,244
BOLSTER
Filed June 1, 1926

Inventor
Thomas H. Symington
By
His Attorney

Patented Aug. 19, 1930

1,773,244

UNITED STATES PATENT OFFICE

THOMAS H. SYMINGTON, OF BALTIMORE, MARYLAND, ASSIGNOR, BY MESNE ASSIGNMENTS, TO T. H. SYMINGTON AND SON, INC., OF BALTIMORE, MARYLAND, A CORPORATION OF MARYLAND

BOLSTER

Application filed June 1, 1926. Serial No. 113,080.

The invention relates to railroad car and truck bolsters.

The principal object of the invention, generally stated, is to provide the combination of a truck bolster and a body bolster constructed and arranged and provided with means for cooperation with side bearing rollers located between them.

An important object of the invention is to provide a bolster construction in which the preliminary load is sustained by spring supported side bearings, the final weight coming upon the center bearing, in the usual manner, the resilient supporting elements for side bearings assisting in sustaining the load and in permitting limited relative yielding of the truck and body bolsters as is necessary to avoid excessive rigidity.

A more specific object of the invention is the provision of a bolster combination in which the side bearings in the truck bolster are resiliently supported, the spring means for the purpose being normally under a certain amount of compression so that the side bearing at either side may move upwardly in case of side roll of the car toward the opposite side, the side bearing being then in position to yield when the rebound occurs, while checking the rebound in such manner as to absorb the shock and prevent the communication of any hammer-like blows or impacts to any part of the mechanism, thereby reducing danger of injury to any of the parts of the truck and its accessories, as well as the bolster.

A further object of the invention is to provide a socket structure mounted in a car body bolster in vertical alinement with a pocket in the truck bolster, the socket accommodating a roller which bears upon the side bearing mounted in the pocket, the provision of the socket permitting the use of a roller of much greater diameter than could be used otherwise, it being obviously of advantage to employ a large roller inasmuch as its strength will be greater and its frictional resistance to relative swinging movement of the bolsters less.

An additional object of the invention is to provide such a socket structure which may be installed within an ordinary body bolster, and to provide a truck bolster which may be used to replace one of the ordinary type without involving any alterations in the construction of the side frames or other parts of the truck.

Figure 1:
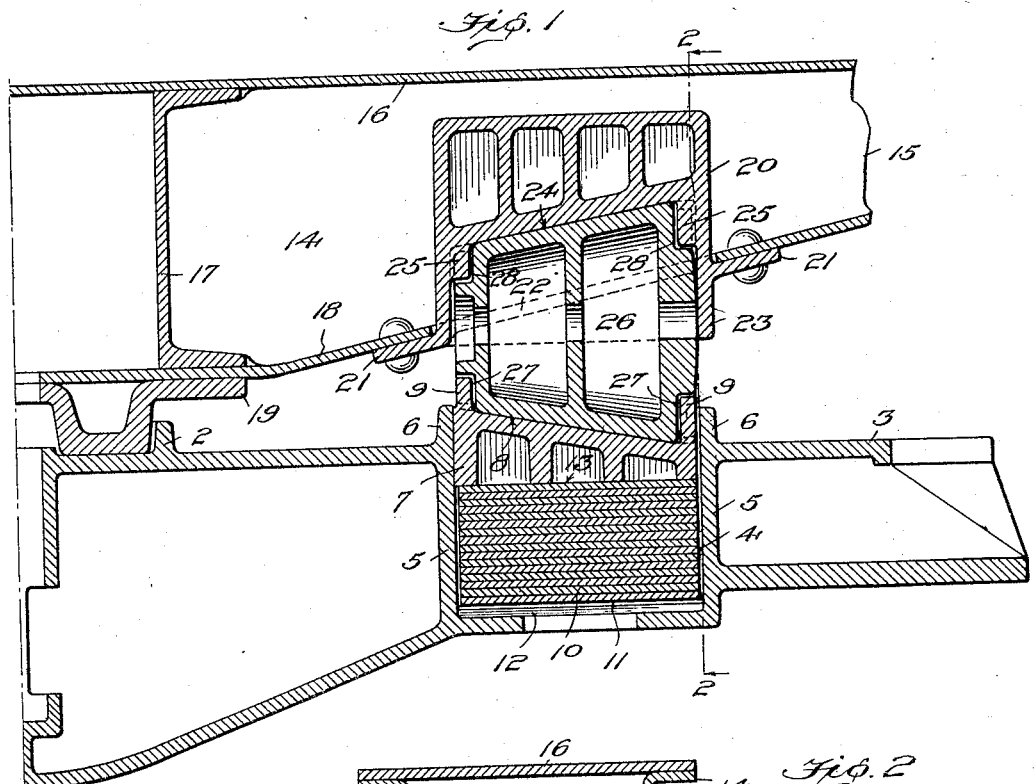
Figure 2:
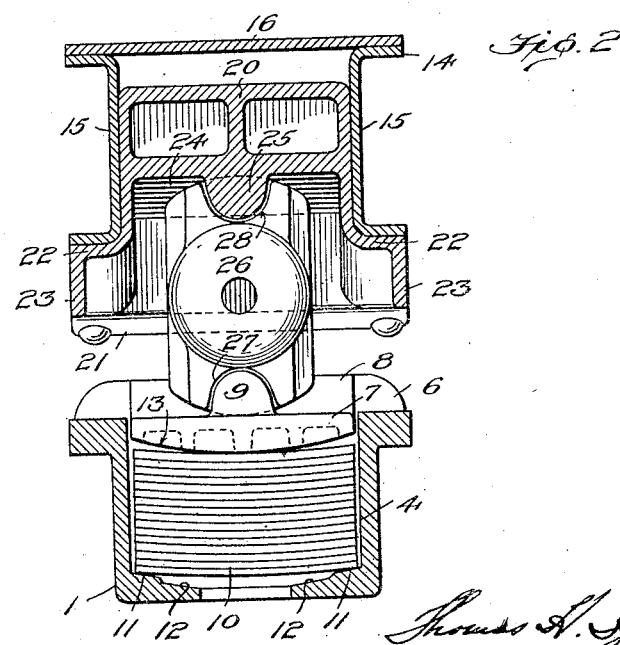

To the attainment of the foregoing and other objects and advantages, the invention preferably consists in the construction, combination and arrangement of parts to be hereinafter more fully described and claimed, and illustrated in the accompanying drawing in which:

Figure 1 is a vertical longitudinal section through a body bolster and a truck bolster both constructed in accordance with the present invention, and Figure 2 is a vertical cross sectional view taken on the line 2—2 of Figure 1 and looking in the direction of the arrow.

Referring more particularly to the drawings, the numeral 1 designates the truck bolster which may be of any desired detailed construction in so far as the matter of webs, reinforcements and braces is concerned. This bolster is provided with the usual center bearing 2 and has the usual extension 3 at each end for engagement within the window opening of the truck side frame, not shown. Outwardly of its center the truck is formed at each end with a pocket 4 which may be defined by vertically extending transversely arranged partition elements or webs 5 which are preferably prolonged upwardly beyond the top surface of the bolster to define guides 6 for the side bearing plate 7 which is located within the pocket and which is shown as having an inclined upper surface 8 at the ends of which are preferably provided upstanding projections or teeth 9 which may be of the semicircular shape shown or of any other desired and suitable specific configuration.

It is preferable that the side bearing plate 7 be resiliently supported, and for this reason I have disclosed a bank of leaf springs 10 located within the pocket 4 and bearing upon ledges 11 at the opposite sides of the bottom thereof. As the springs are intended to flex downwardly, the upper surface of the bottom of the pocket is shown as transversely concaved at 12, the undersurface of the bearing plate 7 being convexed as illustrated at 13 so that upon the application of downward pressure against the springs they may yield downwardly with a proper curvature, the convexity of the undersurface of the side bearing plate causing the pressure and strain to be distributed uniformly.

The body bolster of the car is designated by the numeral 14 and it may be of the usual construction, including the channel sides 15 connected by the top plate 16 which passes transversely of and is secured to the car center sills 17. The body bolster further includes a bottom plate 18, likewise secured to the center sills and carrying a center plate 19 which fits within the center bearing 2, the latter consequently sustaining the load, or at least the major portion thereof.

In accordance with the present invention the bottom plate 18 of ordinary construction is either replaced by one formed in sections or else it is provided with an opening for the accommodation of a socket member or bearing device 20 which may be of any specific construction desired in so far as webs, etc. are concerned, but which is here shown as having flanges 21 and 22 secured respectively to the undersides of the bottom cover 18 and channel side members 15. The outer endmost portion of the socket or bearing member 20 is preferably prolonged downwardly beyond the bottom of the bolster as shown at 23. The member 20 is of a recessed construction and the bottom of the recess has an inclined wall 24 preferably of the same pitch as the inclined top wall 8 of the bearing plate member 7. The member 20 is also preferably provided at opposite ends with projections or teeth 25 similar to the projections or teeth 9.

Located between the members 7 and 20 is a roller 26 preferably cored out for the sake of lightness and this roller is tapered or frusto-conical in shape so that its periphery will conformingly engage against the inclined surfaces 8 and 24 of the members 7 and 20 respectively. The roller is confined between the opposite sides of the lower or recessed portion of the member 20 and has its opposite ends recessed at 27 and 28 for loose interfitting engagement with the teeth or projections 9 and 25, respectively. The guide flange 23 takes the end thrust of the roller and prevents longitudinal outward movement beyond a certain limit. The structure is of course the same at both ends of the bolsters.

In the operation, it will of course be understood that the preliminary load is sustained by the springs 10 and that the final weight, or the major portion thereof, is sustained by the center bearing 2, the side bearing structures functioning to give stability and prevent side sway of the car with respect to the truck. In the event of rocking movement of the body bolster with respect to the truck bolster, or vice versa, such movement is opposed by the banks of springs 10 and it will be seen that the yieldability of the springs will permit a limited rocking movement of the body bolster, while at the same time the tendency of the springs to return to normal after compression will hold the bearing plate members 7 always in engagement with the rollers 8 and the rollers, in turn, in engagement with the bearing members 20, clearance and hammering being therefore eliminated. When there is swivelling movement of the body bolster and the truck bolster with respect to each other, the rollers 26 will rock and permit such movement without any great degree of friction, the engagement of the teeth 9 and 25 within the recesses at the end portions of the rollers insuring centering of the parts at all times and assisting in the return to normal after any swivelling movement occurs. It will thus be seen that the beneficial results desired will be efficiently and adequately attained in an extremely simple manner.

While I have shown and described the preferred embodiment of the invention it should of course be understood that I reserve the right to make all such changes in the details of construction, arrangement and mounting of the parts as will widen the field of utility and increase the adaptability of the invention provided such modifications or variations constitute no departure from the salient features of the invention or the scope of the claims hereunto appended.

Having thus described the invention, I claim:

1. The combination of a truck bolster having pockets, a bearing member with a flat top surface within each of said pockets, a body bolster, a member removably mounted within each end of the body bolster and having a recess in its underside providing a flat bearing surface located above the corresponding bearing member and above the bottom of the body bolster, rollers engaged between said bearing members and said bearing surfaces, said bearing members and said bearing surfaces being provided with projections extending toward each other, and said rollers having recesses receiving said projections.

2. In combination, a truck bolster having a center bearing and interiorly located vertically extending pockets with concave bottoms below the top of the bolster, a bank of leaf springs within each pocket and supported only at the ends of the lowermost leaf, a bearing member mounted within each pocket and having a convex bottom resting upon said bank of springs, a body bolster having a center plate supported upon said center bearing, recessed bearing members mounted within the body bolster and secured to the bottom thereof, and rollers mounted upon said bearing members and engaging within said recessed bearings.

3. In a railway truck including truck and body bolsters pivotally engaged at their centers, the combination of a side bearing structure including a pocket in each end portion of the truck bolster, a vertically movable bearing member resiliently supported within the pocket, a recessed bearing member removably mounted within each end portion of the body bolster, a roller engaged between said bearing members, guide means projecting upwardly from the truck bolster and other guide means projecting downwardly from the body bolster at the outer end of the roller for taking the outward end thrust thereof.

4. In combination, a truck bolster provided at each end with transverse upstanding wall portions defining a pocket, said wall portions projecting above the top of the bolster to serve as guides, a bearing member vertically movable and removably mounted within the pocket, a bank of plate springs located within the pocket for resiliently supporting said bearing member, a body bolster provided at each end with a bearing member recessed thereinto, said second named bearing member having its outer end portion formed with a depending flange serving as a guide and located above the outer one of said first named guides, and a roller located between and engaging said bearing members, the outer one of the first named guides and the second named guide operating to take the outward or lateral thrust of the roller.

5. In combination, a truck bolster provided at each end with transverse upstanding wall portions defining a pocket, said wall portions projecting above the top of the bolsters to serve as guides, a bearing member vertically movable and removably mounted within the pocket, a bank of plate springs located within the pocket for resiliently supporting said bearing member, a body bolster provided at each end with a bearing member recessed thereinto, said second named bearing member having its outer end portion formed with a depending flange serving as a guide and located above the outer one of said first named guides, and a roller located between and engaging said bearing members, the outer one of the first named guides and the second named guide operating to take the outward or lateral thrust of the roller, said bearing members being formed centrally of their outer and inner end portions with single curved projections extending toward each other, and the end portions of the roller having curved recesses therein receiving said projections.

6. In combination, a truck bolster formed with a pocket located interiorly thereof, an upwardly spring-pressed bearing member located within the pocket, a body bolster having a bottom plate formed with an opening located above the pocket, a bearing member located interiorly of the body bolster and extending through said opening, said second named bearing member having outwardly extending flanges located beneath and secured to the bottom plate of the body bolster, and a roller engaged between said bearing members, both bearing members being formed with projections extending toward each other and the roller being recessed to receive the projections.

7. In combination, a truck bolster provided near each end with a bearing, a body bolster having an opening near each end, a bearing member secured within the opening and recessed to provide a flat bearing surface located above the bottom of the body bolster, said second named bearing member having a depending flanged portion located beneath the sides of the body bolster, and a roller located between said bearing and said bearing member, a portion of said flange overlying the outer end of the roller to take the lateral thrust thereon.

8. In combination, a truck bolster provided near each end with a bearing, a body bolster pivotally connected with the truck bolster and formed near each end with an opening, a bearing member secured to the bottom of the body bolster within the opening therein and extending from side to side with its lower portion laterally offset and extending beneath the sides of the body bolster, said bearing member having a transverse wall spaced downwardly from its top and located above its bottom to provide a bearing surface opposite said first named bearing, and a single roller located between said first named bearing and said bearing surface.

In testimony whereof I affix my signature.

THOMAS H. SYMINGTON.